July 3, 1923.
C. NAPIER
1,461,004
HACK SAW MACHINE OF THE CONTINUOUS BAND TYPE
Filed Dec. 20, 1920  2 Sheets-Sheet 1
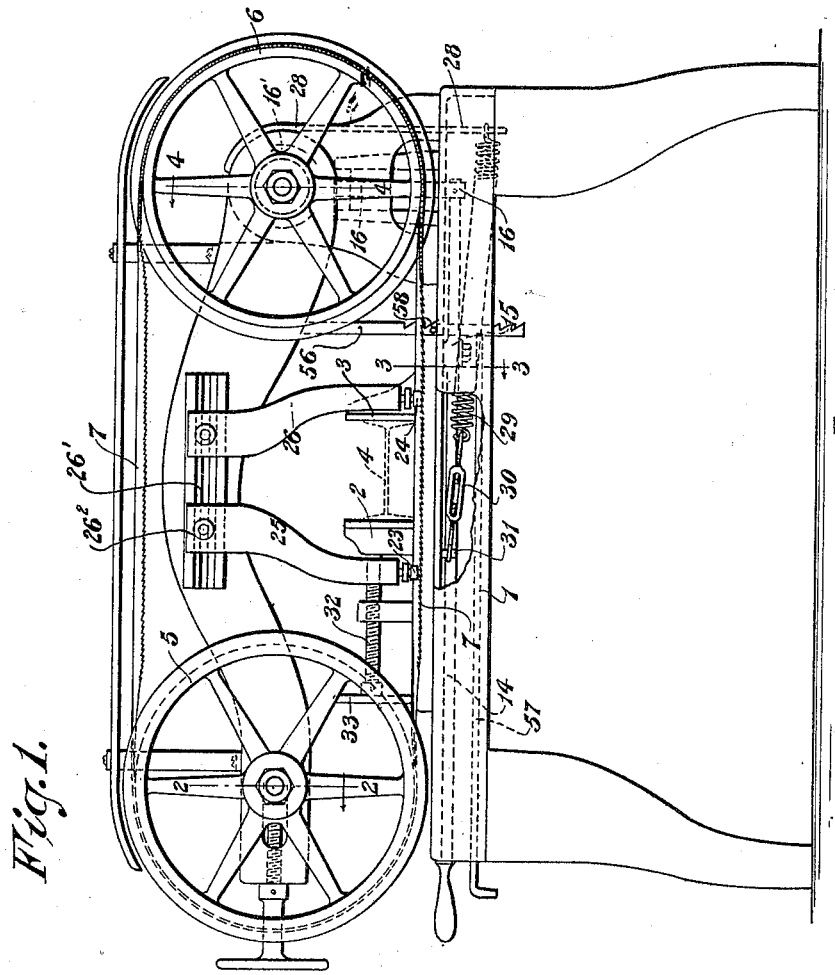
INVENTOR,
Charles Napier,
BY Harry W Bowen
ATTORNEYS.

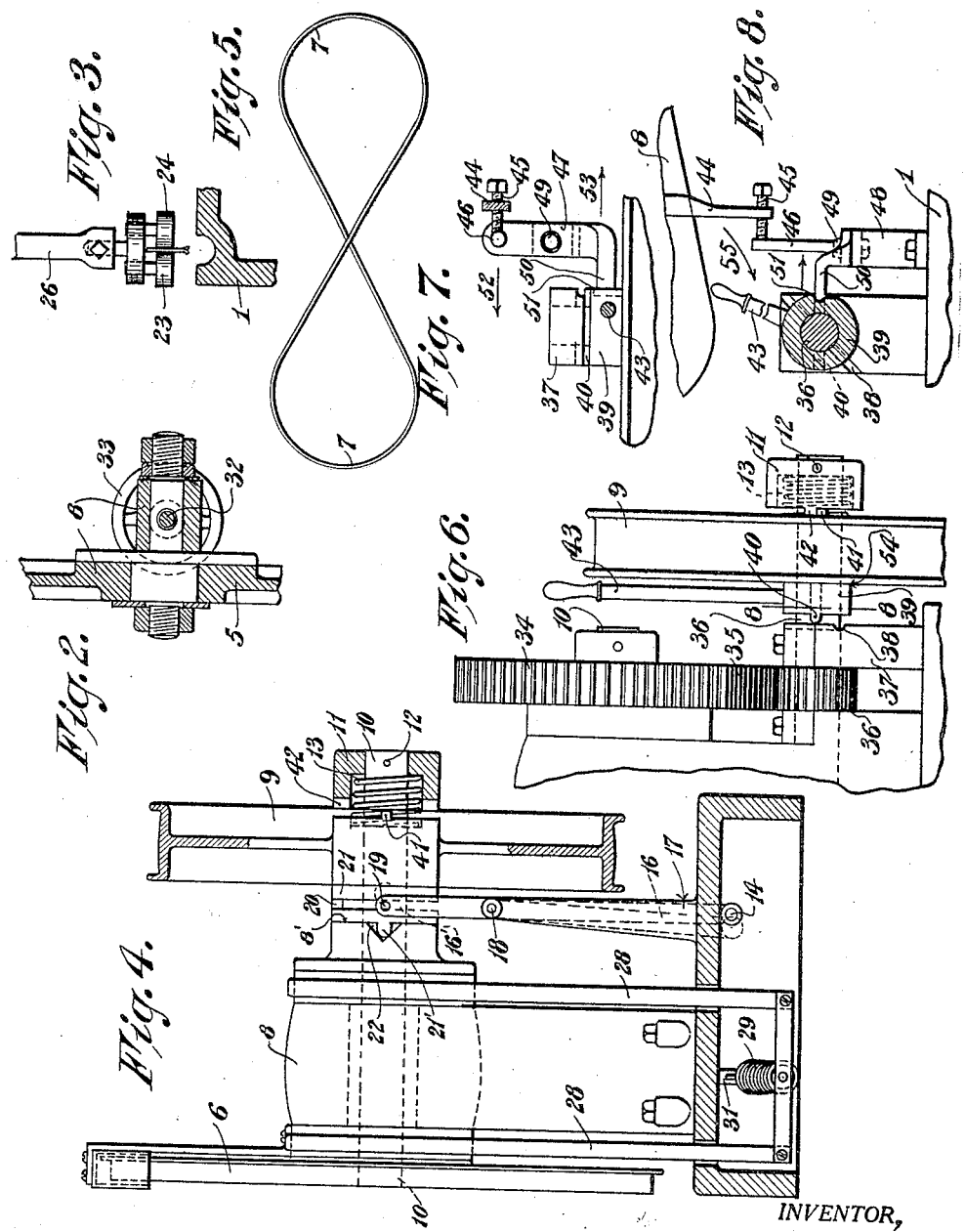

Patented July 3, 1923.

1,461,004

UNITED STATES PATENT OFFICE.

CHARLES NAPIER, OF SPRINGFIELD, MASSACHUSETTS, ASSIGNOR TO THE HENRY G. THOMPSON & SON COMPANY, OF NEW HAVEN, CONNECTICUT, A CORPORATION OF CONNECTICUT.

HACK-SAW MACHINE OF THE CONTINUOUS-BAND TYPE.

Application filed December 20, 1920. Serial No. 431,812.

*To all whom it may concern:*

Be it known that I, CHARLES NAPIER, a citizen of the United States of America, residing at Springfield, in the county of Hampden and Commonwealth of Massachusetts, have invented certain new and useful Improvements in Hack-Saw Machines of the Continuous-Band Type, of which the following is a specification.

This invention relates to improvements in hack saw machines of the type in which a continuous band saw is employed to perform the cutting operations.

An object of the invention is to provide a machine for cutting metal in which the band is formed with a permanent "set" or twist therein before the ends are brazed together, whereby as it is carried around it automatically assumes a position in a vertical plane between its supporting wheels or pulleys where the cutting operation takes place.

A further object is to provide a hack saw machine that will be automatically stopped when the saw completes its cutting operations.

The usual power operated hack saws are of two types, (1) machines having means for supporting and operating a reciprocating blade, and, (2) machines in which a continuous blade passes around two or more pulleys, one or more of which is power driven.

The simplest construction comprises a continuous band running around two pulleys, the work being fed across the toothed edge of the band and parallel to the axes of the pulleys. The pressure of the work against the edge of the blade has a tendency to force the blade off of the pulleys. Furthermore, the length of the stock which can be cut transversely, or cross cut, is limited, since it cannot be longer than the distance between the leads or strands of the blade. In order to overcome the latter difficulty some power operated hack saws have been constructed with a plurality of pulleys, (usually four or more), two or more of which act as idle pulleys and are positioned with their axes in angular relation to the axes of the pulleys between which the cutting lead of the band runs, so that the idle or guiding pulleys are out of the path of the work.

In other constructions a single pair of pulleys for the saw blade is employed and the cutting lead or strand of the blade is twisted through an angle of ninety-degrees between the pulleys so that its edge is held at right angles to the axes of the pulleys, (or at right angles to the faces of the pulleys upon which the blade runs). In the latter instance the binding of the blades by the guide and the sharp flexures produced by the guides quickly causes crystallization which results in the breaking of the blades. Furthermore, so great an exertion is required by the guides to bend the blade at right angles to its normal position that the guides become rapidly worn and consequently the blade fails to cut squarely and accurately across the work.

The present invention contemplates the twisting of the blade itself, when applied to the pulleys, in such a manner as to cause a normal rotation of the blade transversely of its longitudinal axis through an angle of 180-degrees as it passes along the lead in which the cutting field is located. This desirably is accomplished by twisting the blade transversely of its axis through an angle of 360-degrees before the free ends of the blade are brazed together to produce a continuous blade.

If the pulleys are of equal diameter the blade is twisted through an angle of 90-degrees in half the length of the cutting lead and through another 90-degrees in the remaining half of the lead so that the exact central portion of the lead stands normally in a plane perpendicular to a plane tangential to the lines in which the lead engages the faces of the pulleys. If the pulleys are of different diameters the same general result is obtained, except that the perpendicular position of the blade is nearer the smaller pulley.

If the pulleys are placed a considerable distance apart, as is the case in hack saw machines of the continuous band type, practically the entire cutting field of the blade stands in a position perpendicular to the tangential plane in which the blade engages the faces of the pulleys. Desirably guides are provided which engage the blades at the ends of the cutting field mainly for the purpose of preventing vibration of the blade, but incidentally to insure the maintenance of the cutting portion of the blade throughout the cutting field in a plane exactly perpendicular to the axis of the work. No substantial strain is placed upon such guides and it is found that in actual practice a hack saw embodying this invention, and operated in the manner aforesaid, will cut a 3" round section of steel with a variance of less than .002" which has never, so far as I am aware, been equalled in accuracy by any type of hack saw machine. By thus causing a normal rotation of the blade transversely of its axis between the faces of the pulleys the blade is not subjected to any injurious flexure such as occurs where the blade is bent abruptly by guides in the manner above described with respect to prior devices and the life of the band saw is not shortened by its use in this manner.

Where the blade is twisted transversely through an angle of 360-degrees before the ends are brazed together and applied to the pulleys in such a manner that the upper and lower leads lie upon opposite sides of the plane of the axes of the pulleys, the blade will normally rotate in a direction transversely of its axis through 180-degrees in one direction as it passes along one lead, and will rotate a corresponding 180-degrees in the opposite direction as it passes along the other lead between said pulleys. By reason of this gradual twisting action first in one direction and then in the other any permanent setting of the metal of the blade, due to twisting action, is avoided.

Referring to the drawings:

Fig. 1 is a side elevational view of the complete machine showing the supporting pulleys for the band saw, also the means for balancing the arm which is mounted for rotative movement about the bearing for the drive shaft.

Fig. 2 is a vertical sectional view on the line 2—2 of Fig. 1 showing the means for adjusting the tension of the band saw by moving the shaft of the saw supporting wheel.

Fig. 3 is a sectional view on the line 3—3 of Fig. 1 showing the oil drip channel for the band saw.

Fig. 4 is a view on the line 4—4 of Fig. 1 showing the clutch construction for automatically stopping the saw at the end of the cut.

Fig. 5 is a view showing the shape or form that the band takes before it is placed on the supporting pulleys.

Fig. 6 is a clutch operating mechanism showing a gear drive for the band saw.

Fig. 7 is a plan view of the device for causing the clutch to open at the end of the cut of the saw.

Fig. 8 is a sectional view taken on the line 8—8 of Fig. 6 showing the device for automatically throwing the clutch collar when the saw supporting arm reaches its lowest position at the end of the cut, and causing the operation of the machine to cease.

A further feature of the invention consists in mounting a twisted blade of the type described upon pulleys carried by an arm which is pivotally mounted at one end, preferably upon the shaft which carries the driving pulley, and in providing adjustable counterbalancing means for partially sustaining the weight of the free end of the arm and the other pulley which carries the band saw. By adjusting the counterbalancing means the pressure of the saw upon the work, caused by the action of gravity, may be adjusted in correlation to the normal cutting speed of the saw upon the material which is being cut, so that the action of gravity will cause the saw to feed itself through the material at substantially or exactly the rate required for the greatest efficiency in cutting. Where the work to be cut is hard, therefore, the counterweight will be adjusted so that the saw rests lightly upon the work, whereas when relatively soft materials are to be cut the counterweight may be so adjusted as to permit an increased pressure upon the arm by gravity to force the saw more rapidly through the work.

Referring to the drawings in detail: 1 designates the main frame or bed-piece on which the operative parts of the machine are placed, 2 and 3 the work holding jaws, 4 designates in dotted lines a piece of work located therein. 5 and 6 designate the saw supporting pulleys on which the band saw 7 is placed. This band saw 7 is shown in detail in Fig. 5. 8 designates the swinging arm which carries the pulley 5 at its outer end. This arm is supported at its opposite end about the bearing box of the drive shaft of the saw supporting pulley 6, so as to be raised and lowered about this box as a center. 9 designates the drive pulley to which power is supplied and is slidably secured to the shaft 10. 11 designates a recessed clutch block which is secured to the shaft 10 by means of the pin 12. Located in the recessed portion of the block 11 is a coiled expansion spring 13 which serves to normally separate the clutch faces of the pulley 9 and block 11. For the purpose of placing the clutch in gear, an operating lever 14 extends to the forward end of the machine. This lever is pivoted to the bottom of the main frame at 15. Attached to the rear end of the lever 14 is a forked arm 16 which is pivoted to the upright piece 17 at 18. The forked part 16' carries pins 19 which enter the groove 20 that is formed on the ring 21, which is loosely mounted on the shaft 10 and between the pulley 9 and the face 8' of the arm 8. Formed in the face 8' of the bearing is a conical shaped recess 22 to receive the integral projection 21' of the ring 21 when the arm 8 is in a horizontal or its lowest position shown in Fig. 1. The operation of this clutch part of my improvement is as follows: when the operator lifts the arm 8 upward to place the work 4 in place, it turns about its bearing on the bearing block. This operation causes the projection 21' to leave the recess 22 and force the pulley 9 along the shaft 10 and cause the clutch faces of the pulley 9 and block 11 to contact, thus starting the machine and causing the pulley 9 and shaft 10 to revolve, carrying the saw band around. The arm 8 falls as the saw progresses through its work. When the arm 8 reaches its lowest position the projection 21' again enters the recess 22 allowing the spring 13 to expand, open the clutch faces, and automatically stop the operation of the machine. It is, of course obvious that the clutch may be thrown into mesh by means of the hand lever 14, when the parts are in the position shown.

Referring to Fig. 5 which shows the form that the saw band assumes after first being twisted through an arc of 360° and then having the ends brazed together. The band is then partially untwisted and placed on the supporting pulleys 5 and 6, as shown. This initial set or twist of the saw band has the effect of automatically causing the upper and lower strand between the pulleys to assume a vertical position, as shown in Fig. 1. For the purpose of positively directing the movement of the lower strand of the band, and maintaining it in a vertical plane, guide rollers 23 and 24 are located on opposite sides of the blade. Two sets of rollers are employed as shown in Fig. 1. These rollers are supported from the adjustable bracket arms 25 and 26 which are slidably mounted in the groove 26' and secured by the bolts 26².

For the purpose of balancing or counterweighting the arm 8, band pieces 28 are attached to the rear part; a spring 29 is attached to this piece to which a turn buckle 30 is connected at one end and to a pin 31 on the frame 1. The turn buckle therefore serves to adjust the tension of the spring 29 for assisting the operator in raising the arm to insert the work.

32 is a screw for moving the clamping piece 2 against the work 4, and a handle wheel 33 is secured to the screw 32 for operating the same.

In the structures shown in Figs. 6, 7, and 8, 34 designates a gear secured to the shaft 10. 35 is a driving pinion meshing therewith. The pinion is secured to the shaft 36 and turns in the bearing 37. This bearing has a transverse groove 38 cut in the face thereof. 39 is a sleeve or collar which is slidably and loosely mounted on the shaft 36 and is formed with a rib 40 which is designed to enter the groove 38 when the machine is inoperative, that is to say when the projections 41 on the wheel or pulley 9 are out of engagement with the projections 42, on the block 11 which is secured by means of the pin 12 to the shaft 36. 43 designates an operator's handle that is attached to the collar 39 for the purpose of partially rotating the collar so as to move the rib out of the groove 38 and against the ungrooved face portion of the bearing 37 and into the position shown in Fig. 6. When the parts 39, 40, 9, 41, and 42 are in these positions the gears 34 and 35 will be driven and the band saw operated. These parts are automatically thrown out of operation at the end of the cutting operation of the saw band, and the machine stopped when the arm 8 reaches its lowermost position, or that shown in Fig. 1, by means of the devices shown in Figs. 7 and 8, which are as follows: attached to the arm 8 is a depending piece 44 having a set screw 45 therein at its lower end. This set screw engages a pin 46 which projects upward from the L-shaped lever 47 that is pivotally attached to the post 48 at 49. 50 designates an offset arm or portion of the lever 47 which extends to and is designed to engage the shoulder 51 on the collar 39 (see Figs. 7 and 8).

The operation is as follows: The operator raises the arm 8. Then he inserts the work or piece 4 which is to be cut. The saw guide arms 25 and 26 are adjusted a distance from each other substantially equal to the width of the piece to be cut, whereby the saw is prevented from buckling or breaking as it passes through the work. The operator now turns the collar 39 by means of the handle 43 into the position shown in Figs. 6, 7, and 8 which operation moves the pulley 9 along the shaft 36 against the tension of the spring 13 bringing the projections 41 and 42 into engagement, thus causing the shaft 36 to turn through the block 11, and the band saw to be driven through the gears 34 and 35. The arm 8 descends as the saw passes through the work. At the completion of the cut the screw 45 on the arm 44 strikes the pin 46 moving that end of the lever arm 47 about the pin 49 in the direction of the arrow 52, and the other end of the lever arm in the direction of the arrow 53, whereby the end 50 is withdrawn from the stop shoulder 51, thus causing the collar 39 on the shaft 36 to be turned by the pulley 9 so that the rib 40 will coincide and enter the groove 38. The collar 39 will be turned to this position by the pulley 9 on account of the frictional engagement between the engaging faces 54 of the pulley and collar, since the expansive force of the spring 13 will move these faces together with sufficient force to cause the collar 39 to turn with the pulley 9 so that the rib 40 will enter the groove 38. The projections 41 and 42 will now be separated by the spring 13, thus stopping the machine and the pulley 9 will turn freely on the shaft 36. The arrow 55 designates the direction of movement of the arm 8. 56 designates a support for the arm while the work is being inserted. This support is operated by means of the rod 57 which is connected thereto. A pin 58 is passed through an opening in the support and engages the table, as shown.

By using gears of different diameters, it is clear that the rate of travel of the band saw may be readily changed for cutting different kinds of material, as brass, steel, or cast iron.

From this construction it will be seen that I have provided means for automatically causing the upper and lower strands of the saw-band to fall into or assume positions in vertical planes by giving the band a permanent set before the ends are brazed. This initial twist prevents the metal of the blade from becoming crystalline and breaking after being in use a short time. This defect is common to band hack-saws now in common use.

What I claim is:

1. A metal sawing machine comprising work clamping means, and relatively movable band saw supporting means having a driving pulley and a guiding pulley, a continuous band saw mounted upon and operated by said pulleys with its leads located upon opposite sides of a plane passing through the axes of said pulleys, said blade being twisted when applied to said pulleys to cause the cutting field of the progressively moving blade to extend normally in a plane substantially perpendicular to a plane tangential to the face of one of said pulleys, and guiding means engaging the cutting lead of said blade adjacent to the ends of the cutting field thereof acting to maintain and insure said perpendicular position of the cutting portion of the blade throughout the entire cutting field.

2. A metal sawing machine comprising a work clamping means, a pivotally mounted saw supporting frame, a plurality of pulleys mounted on said frame, a continuous band saw blade mounted upon and operated by said pulleys, said blade being twisted before application to said pulleys to cause a normal progressive twisting of the moving cutting lead of the blade between said pulleys transversely of its longitudinal axis to present the cutting field thereof in a plane perpendicular to the pivotal axis of the saw supporting frame and guiding means engaging the sides of said blade adjacent to the ends of the cutting field thereof acting to maintain and insure the said perpendicular position of said blade throughout the entire cutting field.

3. A metal sawing machine comprising work clamping means, a saw supporting frame, a plurality of pulleys mounted on said frame, a continuous band saw blade mounted upon and operated by said pulleys, twisted transversely of its longitudinal axis through an angle of 360°, whereby the normal progressive twisting of the cutting lead of said blade between said pulleys will present the cutting field thereof in a plane substantially perpendicular to a plane tangential to the face of one of said pulleys and guiding means engaging the sides of said blade adjacent to the ends of the cutting field acting to maintain and insure said perpendicular position of the blade throughout the entire cutting field.

4. A blade for metal sawing machines comprising a toothed blade twisted through an angle of 360° about its longitudinal axis and united at its ends to form a continuous band saw.

CHARLES NAPIER.